Aug. 5, 1969   E. A. ROGERS   3,458,933
HANDTOOLS
Filed Nov. 16, 1966   2 Sheets-Sheet 1
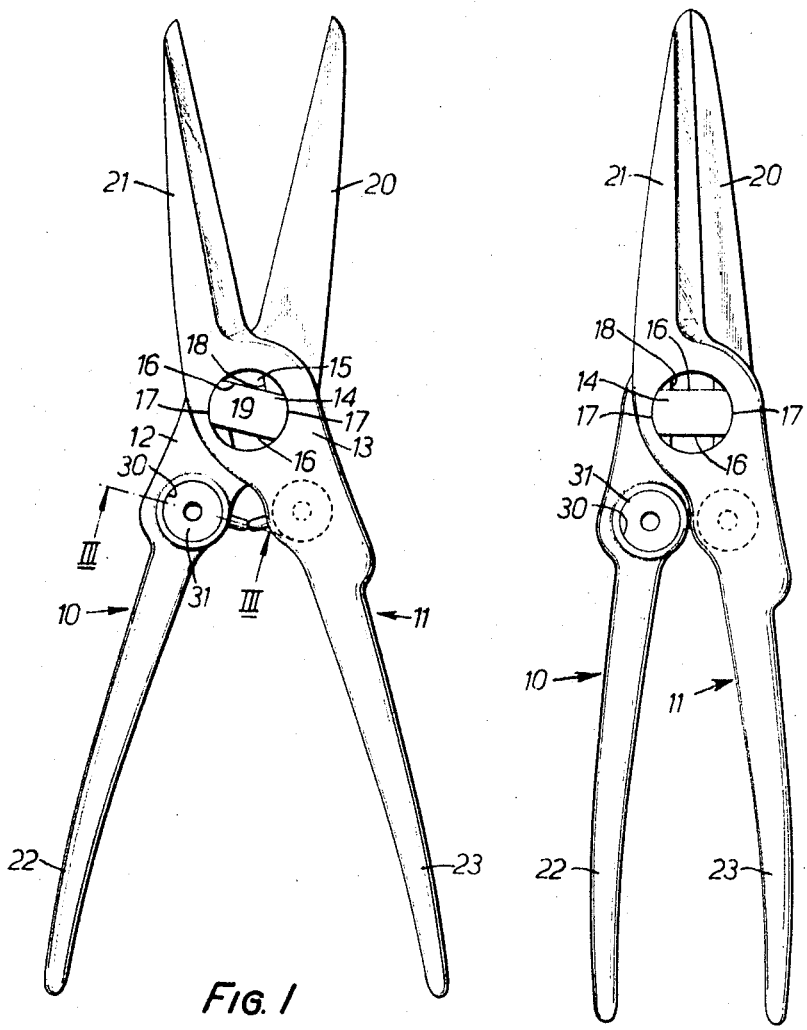
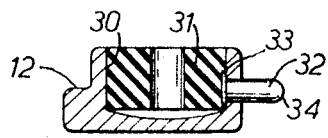
INVENTOR
EDWARD ALBERT ROGERS
BY
Wolfe, Hubbard, Voit & Osann
ATTORNEYS Aug. 5, 1969   E. A. ROGERS   3,458,933
HANDTOOLS
Filed Nov. 16, 1966   2 Sheets-Sheet 2

INVENTOR
EDWARD ALBERT ROGERS
BY
Wolfe, Hubbard, Voit & Osann
ATTORNEYS

United States Patent Office 3,458,933
Patented Aug. 5, 1969

3,458,933
HANDTOOLS
Edward A. Rogers, London, England, assignor to Wilkinson Sword Limited, London, England, a British company
Filed Nov. 16, 1966, Ser. No. 594,812
Claims priority, application Great Britain, Nov. 27, 1965, 50,491/65
Int. Cl. B26b *13/00;* B25b *7/02, 7/08*
U.S. Cl. 30—261                3 Claims

ABSTRACT OF THE DISCLOSURE

In a first embodiment of a handtool a pair of cutter blades is pivotally connected by a pivot pin fast with one member having a T head which engages in a slot in the other member when said members are angularly disposed beyond their normal working relationship. The members and blades rigid therewith are biased apart by two elastomer sleeves, fitted in respective recesses in the members and acting on pins which extend towards one another and make contact with one another when the blades are forced together. In a second embodiment a restoring action is provided by four elastomer cylinders cooperating in a recess of square section in one member with a boss of square section in the other member.

---

This invention relates to handtools of the kind in which two cooperating members are moved together and apart by handles which are coupled to the respective cooperating members. Whilst of broad application, the invention is particularly applicable to cutting or shearing tools such as scissors, pruners or secateurs, garden shears, metal cutters etc.

According to the present invention there is provided a handtool comprising two members, pivot means interconnecting the two members, a recess in one said member accommodating resilient material, means extending out of the recess towards the other member of the tool and biased by said resilient material, whereby when the two parts approach one another the said means and resilient material are effective to force the members away from one another.

Further according to the present invention there is provided a handtool including two pivotally connected members, a recess in one said part, a member of resilient material in said recess and pin means loaded by said resilient member which acts to bias the two pivotally-connected members away from one another when the pin means makes contact with the other pivotally connected member or a part associated therewith.

Still further according to the present invention there is provided a cutter tool including two pivotally connected members, each said member having a recess of cylindrical form the axis of which extends parallel to the pivot axis of the tool, a member of resilient material secured in each said recess and a pin biased through a transverse opening by the resilient member in each said recess towards the corresponding pin of the other pivotally connected member, whereby when the pins of the respective recessess make contact with one another the two pivotally connected members are biased apart.

Still further according to the present invention there is provided a hand tool comprising two pivotally connected parts which are biased to a predetermined relative angular disposition by members of a resilient material.

Yet further according to the present invention there is provided a hand tool comprising two pivotally connected members and a pivot assembly, said assembly including at least one member of resilient material which is held between surfaces of the assembly under relatively low constraint when the members are in a predetermined angular disposition and is subjected to progressively higher constraint as the members are moved away from the said disposition, whereby energy is stored in said resilient member which biases the pivotally connected members to said predetermined disposition.

Two embodiments of hand tools in accordance with the invention will now be described, by way of example, with reference to the accompanying diagrammatic drawings, in which:

FIGURE 1 is a side view of one embodiment with the tool in its open configuration;

FIGURE 2 is a side view of the tool of FIGURE 1 in its closed configuration;

FIGURE 3 is a section on the line III—III of FIG. 1;

Figure 4:
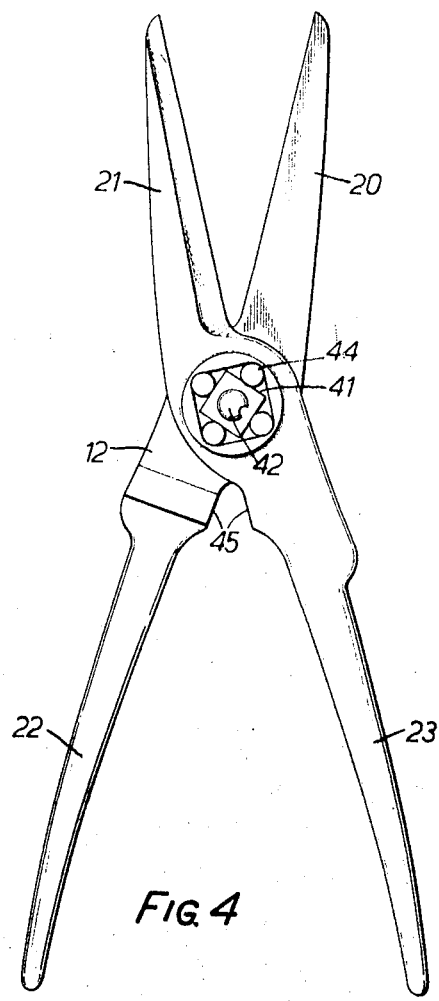
FIGURE 4 is a view of a second embodiment in an open configuration.

Each of the embodiments shown in the drawings takes the form of a cutting tool which comprises two pivotally interconnected members, each said member including a blade portion, an intermediate portion and a handle portion. The invention is primarily concerned with the intermediate portion and the blade and handle portions of each member may have any desired form.

Referring particularly to FIGURES 1, 2, and 3, the two members 10, 11 are interconnected at the intermediate portions 12, 13 by a pin 14 secured to and upstanding from the intermediate portion of one member 12 and by an aperture 15 in the intermediate portion 13 of the other member into which aperture the pin fits. The pin has a head in the form of a cross-piece 19 having two parallel sides 16 spaced apart by an amount substantially equal to the diameter of the shank (not shown) of the pin and the cross-piece has two arcuate ends 17, whilst the aperture 18 in the intermediate portion of the other member has a form complementary to the head of the pin.

In the closed position of the implement, as shown in FIGURE 2, the parallel sides 16 of the head of the pin 14 are substantially at right angles to the parallel sides of the aperture 18. By rotating the two members 10, 11 through a right angle the head of the pin and the aperture 18 are brought into coincidence and the two members can be separated by withdrawing the head through the aperture 18. Conversely, in order to assemble the two members together, the head of the pin 14 is engaged in the aperture 18 and the members pushed towards one another until the head can be turned relatively to the aperture, and the two members can then be rotated relatively to one another to their normal range of movement. It will be appreciated that the depth of the aperture 18 corresponds to the length of the shank portion of the pin so that, when in an assembled condition the cutting edges of the blade portions 20, 21 are in correct relationship. The under surface of the head of the pin slidably engages the end surfaces adjacent the aperture. These engaging surfaces are preferably dished or part spherical.

The intermediate portion 12, 13 of each member, which is wider than the handle portion 22, 23 and than the blade portion 20, 21 has a bore or cylindrical recess 30 extending parallel to the aperture 18 and this bore or recess 30 houses a resilient sleeve or bush 31 of natural or synthetic rubber, or other resilient material. Alternatively, the sleeve may be replaced by a solid cylindrical member of resilient material and in either form the resilient sleeve or member may be covered at each end by an end cap (not shown). As can be seen from FIGURES 1 and 2, the bores or recesses 30 lie on the handle portion side of the pivot assembly. Each bore 30 has a lateral opening which accommodates a button, pip or pin 32, which is biased outwardly from the bore by the resilient sleeve or other member 31. The inner end of the pin 32 is provided with a flange or other means 33 for preventing the pin from falling out completely from the opening under the biasing action of the resilient sleeve or other member. The outer end 34 of each pin is hemispherical and engages, over the normal working range of movement of the members of the implement, the hemi-spherical surface of the corresponding pin of the other member and as will be appreciated, the resilient sleeves or other members bias the two parts of the implement apart.

Thus, in operation, each time a cutting or shearing operation is effected by forcing the handle portions 22, 23 and thereby the blade portions 20, 21 together, the sleeves are deformed and the energy stored in the sleeves restores the blades to their normal open position once the force is removed from the handle portions. An implement could be constructed, in accordance with the invention, using only one resilient sleeve 31 or other member and one pin 32 or button which engages either a fixed projection from the surface of the other member or the other member itself.

Figure 5:
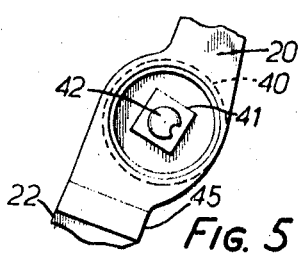
FIGURE 5 is a fragmentary view of one member of the embodiment of FIGURE 4.
Figure 6:
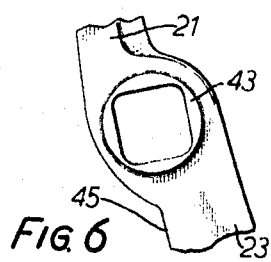
FIGURE 6 is a fragmentary view of another member of the embodiment of FIGURE 4.

Referring now to the embodiments of FIGURES 4, 5 and 6, again the handle portions 22, 23 and blade portions 20, 21 may be of any conventional form, the intermediate portion 12 of one member having boss 40 which carries a pin 41 or other member of square or polygonal cross-section which has an end portion 42 upstanding from the square or polygonal portion 41 and has a screw thread. When assembled the square portion 41 protrudes beyond the plane of the member itself into a sleeve 43 rigid with the other member which sleeve has an internal surface corresponding in shape to the cross-section of the square section portion 41. Thus, if the projection has a square cross-section the inner surface of the sleeve is also square. The pin and the sleeve, are however, spaced apart by an amount sufficient to allow the interposition of four cylindrical rubber members 44 which, in the open position of the implement (as shown in FIG. 4) lie approximately respectively at the middle of each side of the pin 41 and of the internal surface of the sleeve, but which, when there is relative rotation such as that caused by squeezing the handle portions 22, 23 together, are displaced towards one end of the respective sides, thus compressing them and storing energy to provide a return movement of the members.

It will be appreciated, that other configurations of the pin can be envisaged, such as five-sided or three-sided, and that the cylindrical rubber members 44 may be replaced by other members of a resilient material.

Damage by excessive pressure to the cylindrical rubber members 44 is prevented by stops 45 rigid with each member.

The two members forming the implement are held together by a flat nut (not shown) which engages the screwed portion of the projection, if desired with a separate or integral cover for the members 44.

It will be appreciated that the use of rubber or other resilient material for the sleeve or other member provides a biasing force which has the advantage, by comparison with metal resilient members that it will not rust or corrode and that the members themselves are inexpensive. As will be appreciated, it is a simple matter to replace the resilient members when worn.

Latch means may be provided to hold the implement parts in the closed position and conveniently such means can take the form of a gravity-actuated catch which is closed by holding the tool with the tips of the blades lowermost and opened by inverting the tool.

In an alternative construction, the pivot assembly includes a frustoconical boss and a complementary recess. In this alternative construction the bias required to hold the members together is conveniently provided by offsetting one of the buttons with respect to the other. This provides a longitudinal bias forcing the boss into the recess thus maintaining the members in correct relationship during a cutting operation.

I claim:
1. In a handtool:
   a first cutter member having a cylindrical recess therein and having a transverse opening with a longitudinal axis normal to the axis of the cylindrical recess and communicating with said recess,
   a second cutter member pivotally connected to the first cutter member,
   a sleeve-like member of an elastomer material disposed substantially wholly within said recess, and
   projection means biased outwardly from said recess by the elastomer sleeve-like member towards the second member,
   said pivotal members being biased away from one another by the action of the projection means and the elastomer sleeve-like member, whenever the projection means contacts the second member.

2. A handtool according to claim 1, wherein said second member has a cylindrical recess therein and a transverse opening, with a longitudinal axis normal to the axis of the cylindrical recess and communicating with the recess, said tool further comprising:
   a second sleeve-like member of elastomer material in said recess of the second member, and
   second projection means biased outwardly through the transverse opening from said recess in the second member by said resilient material,
   said projection means of both members acting to bias the members apart with the cooperation of the sleeve-like members whenever the projection means contact one another.

3. A handtool according to claim 1, wherein said projection means comprises a pin, the end of which remote from the elastomer member, is rounded and the end of which adjacent and in contact with the elastomer member is flanged.

References Cited
UNITED STATES PATENTS

| | | | |
|---|---|---|---|
| Re. 24,911 | 12/1960 | Leja | 287—85 X |
| 2,712,742 | 7/1955 | Neidhart | 64—14 |
| 317,716 | 5/1885 | Bubach | 30—261 |
| 654,008 | 7/1900 | Kirkland | 30—261 X |
| 1,469,283 | 10/1923 | Storz | 30—266 X |
| 2,142,738 | 1/1939 | Wakeley | 30—253 |
| 2,650,423 | 9/1953 | Phillips | 30—261 |

ROBERT C. RIORDON, Primary Examiner

J. C. PETERS, Assistant Examiner

U.S. Cl. X.R.

30—266; 81—417